(12) United States Patent
Francis et al.

(10) Patent No.: US 10,476,351 B2
(45) Date of Patent: Nov. 12, 2019

(54) ELECTRIC DRIVE MODULE WITH A HOUSING HAVING AN EXTERIOR WALL INTO WHICH A FILTER PICKUP AND A SUCTION TUBE ARE INTEGRALLY FORMED

(71) Applicant: BorgWarner Inc., Auburn Hills, MI (US)

(72) Inventors: Philip J. Francis, Lapeer, MI (US); Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 13 days.

(21) Appl. No.: 15/898,773

(22) Filed: Feb. 19, 2018

(65) Prior Publication Data

US 2019/0260269 A1    Aug. 22, 2019

(51) Int. Cl.
*H02K 9/19* (2006.01)
*F01P 5/12* (2006.01)
*H02K 7/116* (2006.01)
*F01P 11/02* (2006.01)

(52) U.S. Cl.
CPC ............... *H02K 9/19* (2013.01); *F01P 5/12* (2013.01); *H02K 7/116* (2013.01); *F01P 11/0276* (2013.01)

(58) Field of Classification Search
CPC .................................................. F16H 57/0421
See application file for complete search history.

(56) References Cited

U.S. PATENT DOCUMENTS

| 6,484,834 | B2 | 11/2002 | Bowen et al. | |
| 7,087,160 | B2 * | 8/2006 | Beer | B01D 35/0273 156/580.1 |
| 7,497,286 | B2 | 3/2009 | Keller et al. | |
| 7,624,853 | B2 | 12/2009 | Ekonen et al. | |
| 7,635,055 | B2 | 12/2009 | Ekonen et al. | |
| 8,083,636 | B2 | 12/2011 | Showalter | |
| 8,235,198 | B2 | 8/2012 | Pritchard et al. | |

(Continued)

FOREIGN PATENT DOCUMENTS

| CN | 203258028 U | * | 10/2013 | ............. F16H 57/02 |
| JP | 2002225577 A | * | 8/2002 | ............. B60K 17/04 |

(Continued)

*Primary Examiner* — Tisha D Lewis
(74) *Attorney, Agent, or Firm* — Harness, Dickey & Pierce, P.L.C.

(57) ABSTRACT

A drive module with a housing, an electric motor coupled to the housing, a differential assembly, a transmission, and a filter-strainer assembly. The housing has an exterior wall member that defines an internal cavity and a suction tube. The internal cavity at least partly forms a lubricant sump with a sump outlet. The suction tube is spaced apart from and does not intersect the internal cavity such that the suction tube is not in direct fluid communication with the internal cavity. The differential assembly and transmission are received in the internal cavity and the transmission transmits rotary power between the electric motor and the differential assembly. The filter-strainer assembly is coupled to the housing and has a filter-strainer inlet, which is coupled in fluid communication to the sump outlet, and a filter-strainer outlet, which is directly coupled in fluid communication to a suction tube inlet of the suction tube.

19 Claims, 4 Drawing Sheets

(56) References Cited

U.S. PATENT DOCUMENTS

| | | |
|---|---|---|
| 8,308,598 B2 | 11/2012 | Pritchard et al. |
| 8,888,658 B2 | 11/2014 | Pritchard |
| 9,400,034 B1 | 7/2016 | Pritchard et al. |
| 9,410,610 B1 | 8/2016 | Pritchard et al. |
| 9,506,504 B2 | 11/2016 | Francis et al. |
| 9,566,857 B1 | 2/2017 | Pritchard et al. |
| 9,656,541 B2 | 5/2017 | True et al. |
| 9,850,962 B2 | 12/2017 | Pritchard |
| 2003/0037976 A1 | 2/2003 | Bowen et al. |
| 2003/0221921 A1* | 12/2003 | Manrao .................. F15B 11/20 188/264 E |
| 2004/0164009 A1* | 8/2004 | Smith .................... B01D 29/21 210/132 |
| 2005/0189190 A1 | 9/2005 | Kowalsky et al. |
| 2006/0065509 A1 | 3/2006 | Pritchard |
| 2009/0057062 A1* | 3/2009 | Eschenbeck ........ F16H 57/0441 184/6.28 |
| 2015/0291037 A1 | 10/2015 | Pritchard |
| 2015/0330493 A1 | 11/2015 | Pritchard |
| 2017/0217309 A1* | 8/2017 | Hashimoto .............. B60K 5/02 |
| 2018/0010650 A1 | 1/2018 | Francis et al. |

FOREIGN PATENT DOCUMENTS

| | | | |
|---|---|---|---|
| JP | 2006292082 A | * 10/2006 | ......... F16H 57/0421 |
| WO | WO-2017/081217 A1 | 5/2017 | |

* cited by examiner

ELECTRIC DRIVE MODULE WITH A HOUSING HAVING AN EXTERIOR WALL INTO WHICH A FILTER PICKUP AND A SUCTION TUBE ARE INTEGRALLY FORMED

FIELD

The present disclosure relates to an electric drive module with a housing having an exterior wall into which a filter pickup and a suction tube are integrally formed.

BACKGROUND

This section provides background information related to the present disclosure which is not necessarily prior art.

Electric drive modules are increasingly configured with an oil pump for the circulation of oil for lubrication of various components, cooling of an electric motor, and/or operation of one or more hydraulic devices, such as a hydraulically-operated friction clutch. While it can be desirable to mount the oil pump at a relatively low location so that oil can drain via gravity into the suction inlet of the pump, the placement of the oil pump in this manner has certain drawbacks, including a reduction in ground clearance. Consequently, it can be desirable in some instances to mount the oil pump at a different location. This approach, however, has several drawbacks that are associated with the various fittings, adapters and hoses that are needed to communicate oil to the oil pump, including an increased number and cost of parts and a potential reduction in ground clearance.

SUMMARY

This section provides a general summary of the disclosure, and is not a comprehensive disclosure of its full scope or all of its features.

In one form, the teachings of the present disclosure provide an electric drive module that includes a housing, an electric motor, a differential assembly, a transmission and a filter-strainer assembly. The housing has an exterior wall member that defines an internal cavity and a suction tube. The internal cavity at least partly forms a lubricant sump with a sump outlet. The suction tube is spaced apart from and does not intersect the internal cavity such that the suction tube is not in direct fluid communication with the internal cavity. The electric motor is coupled to the housing. The differential assembly is received in the internal cavity. The transmission is received in the internal cavity and transmits rotary power between the electric motor and the differential assembly. The filter-strainer assembly is coupled to the housing and has a filter-strainer inlet, which is coupled in fluid communication to the sump outlet, and a filter-strainer outlet, which is directly coupled in fluid communication to a suction tube inlet of the suction tube.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
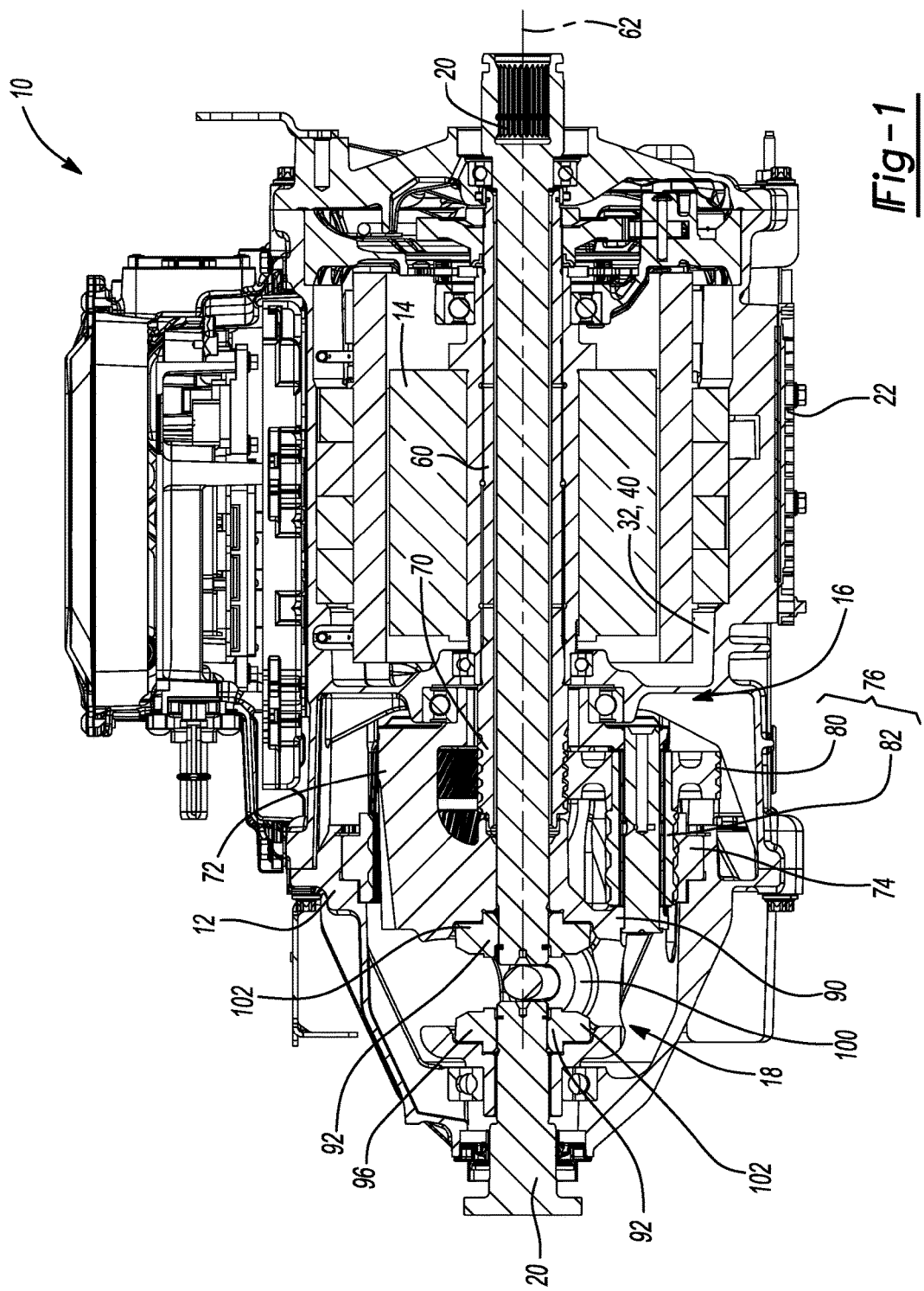
FIG. 1 is a lateral cross-sectional view of an exemplary electric drive module constructed in accordance with the teachings of the present disclosure.
Figure 4:
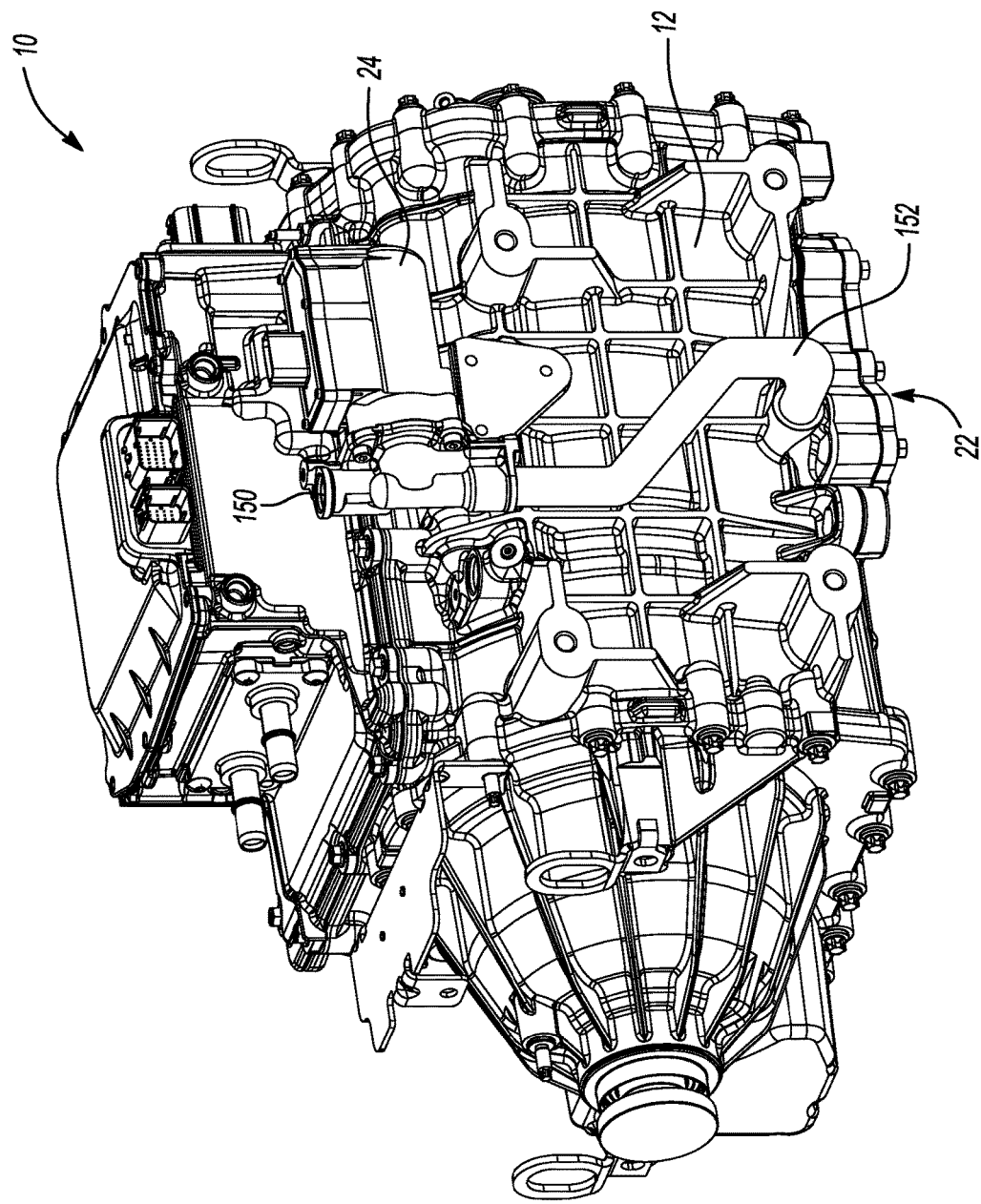
FIG. 4 is a perspective view of a side of the electric drive module of FIG. 1.

With reference to FIG. 1, an exemplary electric drive module constructed in accordance with the teachings of the present disclosure is generally indicated by reference numeral 10. The electric drive module 10 can include a housing 12, an electric motor 14, a transmission 16, a differential assembly 18, a pair of output shafts 20, a filter-strainer assembly 22 and a lubricant pump 24 (FIG. 4).

Figure 2:
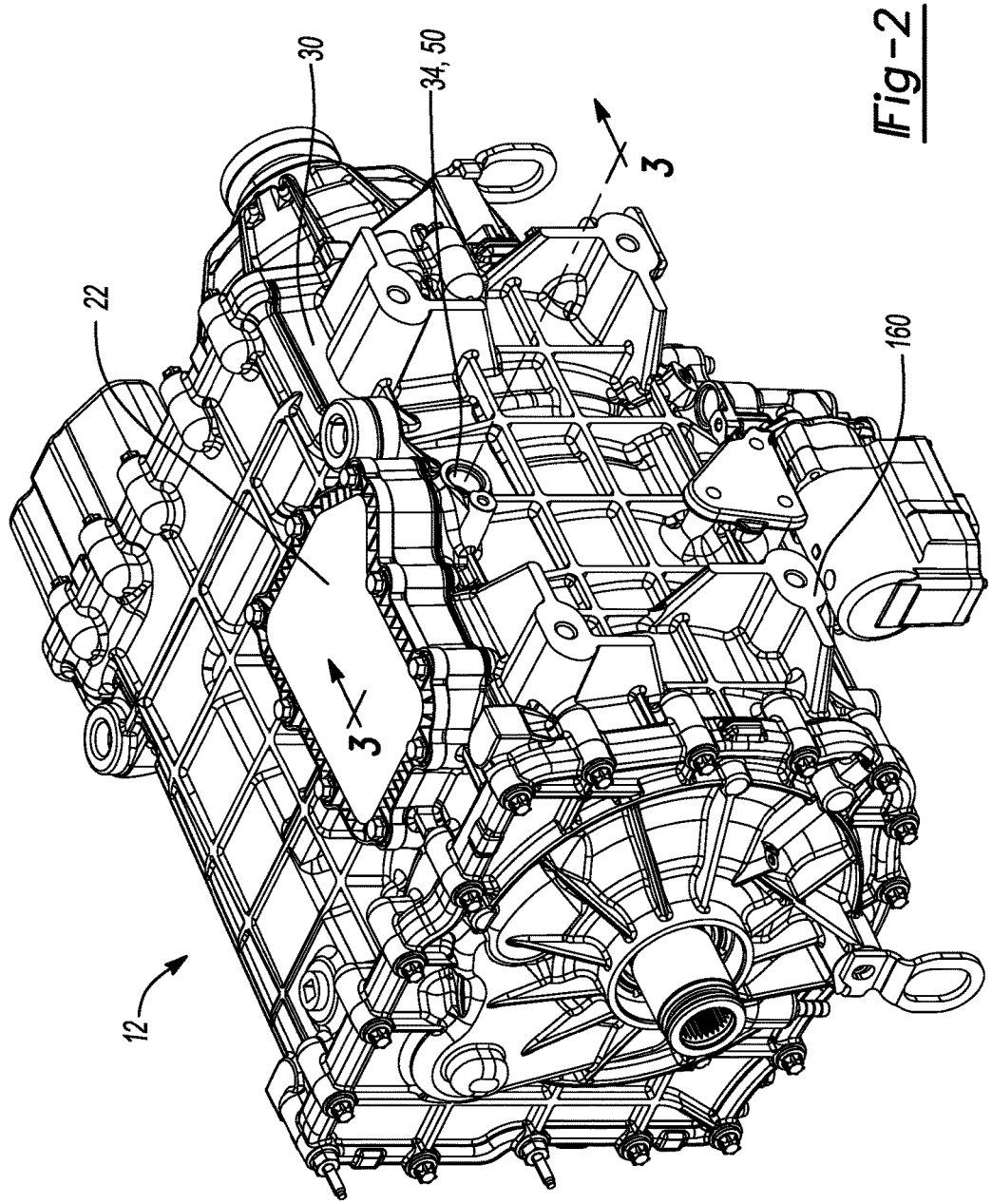
FIG. 2 is a bottom perspective view of a portion of the electric drive module of FIG. 1 in which a lubricant pump has been omitted for clarity.
Figure 3:
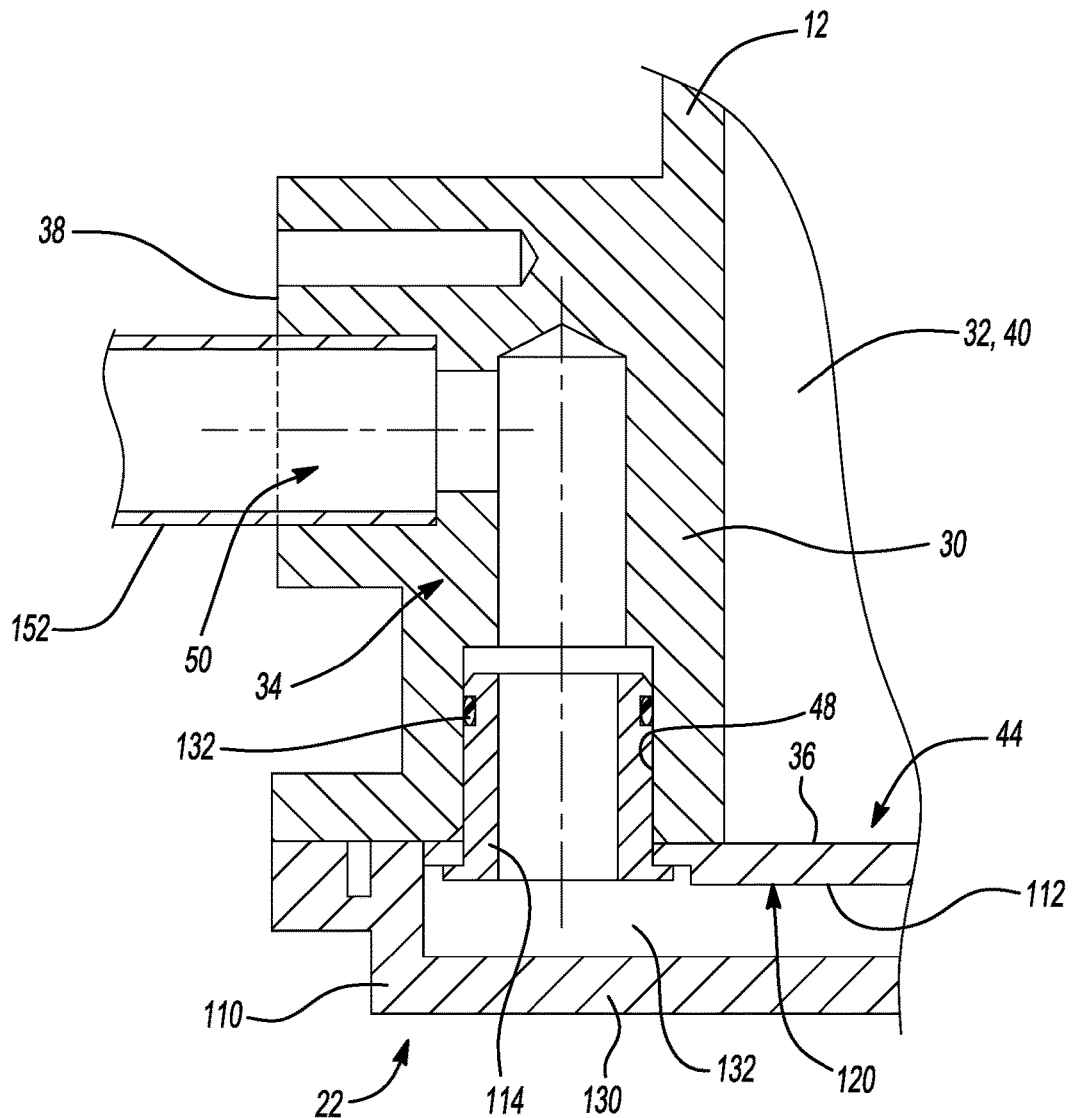
FIG. 3 is a section view taken along the line 3-3 of FIG. 2.

With reference to FIGS. 1-3, the housing 12 can have an exterior wall member 30 that can define an internal cavity 32 (FIG. 1), a suction tube 34, a first housing face 36 and a second housing face 38. The internal cavity 32 can at least partly form a lubricant sump 40 that is configured to hold an appropriate lubricant. The lubricant sump 40 can have a sump outlet 44 (FIG. 3) that can extend through the first housing face 36. The suction tube 34 can be spaced apart from (so as not to intersect) the internal cavity 32 such that the suction tube 34 is not in direct fluid communication with the internal cavity 32. The suction tube 34 can have a suction tube inlet 48, which can extend through the first housing face 36, and a suction tube outlet 50 that can extend through the second housing face 38. In the particular example provided, the first and second housing faces 36 and 38 are perpendicular to one another, but it will be appreciated that the first and second housing faces 36 and 38 could be oriented differently relative to one another.

In FIG. 1, the electric motor 14 can be coupled to the housing 12 in any desired manner. In the example provided, the electric motor 14 is received in the internal cavity 32 in the housing 12 and has a motor output member 60 that is rotatable about a rotational axis 62.

The transmission 16 can be configured to transmit rotary power between the motor output member 60 and the differential assembly 18. In the particular example provided, the transmission 16 comprises a planetary reduction having a sun gear 70, which is coupled to the motor output member 60 for rotation therewith, a planet carrier 72, a ring gear 74 that is non-rotatably coupled to the housing 12, and a plurality of compound planet gears 76. Each of the compound planet gears 76 is journally supported by the planet carrier 72 and includes a first planet gear 80, which is meshingly engaged to the sun gear 70, and a second planet gear 82 that is non-rotatably coupled to the first planet gear 80 and meshingly engaged to the ring gear 74. The pitch diameter of the second planet gear 82 can be smaller than the pitch diameter of the first planet gear 80 so that the compound planet gears 76 provide an additional reduction between the sun gear 70 and the ring gear 74. It will be appreciated, however, that the transmission 16 could be configured differently.

The differential assembly 18 can be received in the internal cavity 32 and can include a differential input 90, a pair of differential outputs 92, and a means for providing speed differentiation between the differential outputs 92. In the example provided, the means for providing speed differentiation comprises a bevel gearset 96 and as such, the differential input 90 can comprise a differential case that is coupled to the planet carrier 72 for rotation therewith about the rotational axis 62. Each of the differential outputs 92 can have an internally-splined aperture that is configured to matingly engage a male splined segment of an associated one of the output shafts 20. In the example provided, one of the output shafts 20 extends along the rotational axis 62 concentrically within the sun gear 70 and the motor output member 60 and through an axis end of the housing 12 that is opposite the end in which the differential assembly 18 is disposed. The bevel gearset 96 can comprise a plurality of differential pinions 100 (only one shown) and a pair of side gears 102. Each of the differential pinions 100 is mounted to the differential case (i.e., differential input 90) for rotation about an associated pinion axis that is perpendicular to the rotational axis 62. Each of the side gears 102 is unitarily and integrally formed with an associated one of the differential outputs 92 and is meshingly engaged with the differential pinions 100. Alternatively, the differential assembly 18 can employ a helical differential gearset that utilizes pair of meshingly engaged helical differential pinions, or a planetary-type differential, or one or more friction clutches.

With reference to FIG. 3, the filter-strainer assembly 22 can be sealingly engaged to the housing 12 and can include a filter-strainer body 110, a filter-strainer member 112 and a filter-strainer output member 114. The filter-strainer body 110 can be formed of plastic and can define a filter-strainer output inlet 120 that can be coupled in fluid communication with the sump outlet 44. The filter-strainer member 112 can be formed of a porous material, such as a fine mesh screen, and can be fixedly coupled to the filter-strainer body 110 at a location where the filter-strainer member 112 is interposed between the sump outlet 44 and the filter-strainer output member 114. In the example provided, the filter-strainer member 112 is spaced apart from a lower wall 130 of the filter-strainer body 110 to form a filtered fluid channel 132. The filtered lubricant that has passed through the filter-strainer member 112 is received into the filtered fluid channel 132 and directed to the filter-strainer output member 114. The filter-strainer output member 114 can be a hollow, tubular structure that can be disposed sealingly engaged to the filter-strainer body 110 and in fluid communication with the filtered fluid channel 132 and the suction tube inlet 48. In the particular example provided, the filter-strainer output member 114 is received into the suction tube inlet 48. A seal 134 can be disposed between the filter-strainer output member 114 and the portion of the exterior wall member 30 that forms the suction tube inlet 48. In the example provided, the seal 134 comprises an O-ring that is received in a seal groove formed in the filter-strainer output member 114.

With reference to FIGS. 3 and 4, the lubricant pump 24 can have a pump inlet 150 that can be coupled in fluid communication to the suction tube outlet 50. In the particular example provided, a lubricant conduit 152 is employed to couple the pump inlet 150 to the suction tube outlet 50 in fluid communication. Construction in this manner permits the lubricant pump 24 to be mounted to a pump mount 160 (FIG. 2) formed on the housing 12 at a location that is spaced apart from the suction tube outlet 50. Alternatively, the pump inlet 150 can be coupled directly to the suction tube outlet 50.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module comprising:
   a housing having an exterior wall member that defines an internal cavity and a suction tube, the internal cavity at least partly forming a lubricant sump with a sump outlet, the suction tube being spaced apart from and not intersecting the internal cavity such that the suction tube is not in direct fluid communication with the internal cavity;
   an electric motor coupled to the housing, the electric motor having a motor output member that is rotatable about a rotational axis;
   a differential assembly received in the internal cavity, the differential assembly having a differential input that is rotatable about the rotational axis;
   a transmission received in the internal cavity and transmitting rotary power between the electric motor and the differential assembly, the transmission having a transmission input, which is coupled to the motor output member for rotation therewith, and a transmission output, which is coupled to the differential input for common rotation;
   a filter-strainer assembly coupled to the housing, the filter-strainer assembly having a filter-strainer inlet, which is coupled in fluid communication to the sump outlet, and a filter-strainer outlet, which is directly coupled in fluid communication to a suction tube inlet of the suction tube.

2. The electric drive module of claim 1, further comprising a lubricant pump and a lubricant conduit, the lubricant pump having a pump inlet, the lubricant conduit being coupled in fluid communication to a suction tube outlet of the suction tube and the pump inlet.

3. The electric drive module of claim 2, wherein the housing defines a pump mount and wherein the pump inlet is formed in the pump mount.

4. An electric drive module comprising:
   a housing having an exterior wall member that defines an internal cavity and a suction tube, the internal cavity at least partly forming a lubricant sump with a sump outlet, the suction tube being spaced apart from and not intersecting the internal cavity such that the suction tube is not in direct fluid communication with the internal cavity;
   an electric motor coupled to the housing;
   a differential assembly received in the internal cavity;
   a transmission received in the internal cavity and transmitting rotary power between the electric motor and the differential assembly; and
   a filter-strainer assembly coupled to the housing, the filter-strainer assembly having a filter-strainer inlet, which is coupled in fluid communication to the sump outlet, and a filter-strainer outlet, which is directly coupled in fluid communication to a suction tube inlet of the suction tube;
   wherein the differential assembly has a pair of differential outputs and wherein the electric drive module further comprises a pair of output shafts that are received into the housing, each of the output shafts being drivingly coupled to a corresponding one of the differential outputs.

5. The electric drive module of claim 1, wherein the external wall member defines first and second housing faces, wherein the sump outlet and the suction tube extend through the first housing face, and wherein the suction tube outlet extends through the second housing face.

6. The electric drive module of claim 5, wherein the first and second housing faces are perpendicular to one another.

7. An electric drive module comprising:
a housing having an exterior wall member that defines an internal cavity and a suction tube, the internal cavity at least partly forming a lubricant sump with a sump outlet, the suction tube being spaced apart from and not intersecting the internal cavity such that the suction tube is not in direct fluid communication with the internal cavity;
an electric motor coupled to the housing;
a differential assembly received in the internal cavity;
a transmission received in the internal cavity and transmitting rotary power between the electric motor and the differential assembly; and
a filter-strainer assembly coupled to the housing, the filter-strainer assembly having a filter-strainer inlet, which is coupled in fluid communication to the sump outlet, and a filter-strainer outlet, which is directly coupled in fluid communication to a suction tube inlet of the suction tube;
wherein the filter-strainer outlet comprises a hollow tube that is received into the suction tube inlet and wherein a seal is disposed about the hollow tube and sealingly engages both the external wall member and the hollow tube.

8. The electric drive module of claim 1, wherein the suction tube has a suction tube outlet, wherein the electric drive module further comprises a lubricant pump having a pump inlet, and wherein the pump inlet is directly coupled to the suction tube outlet.

9. The electric drive module of claim 4, further comprising a lubricant pump and a lubricant conduit, the lubricant pump having a pump inlet, the lubricant conduit being coupled in fluid communication to a suction tube outlet of the suction tube and the pump inlet.

10. The electric drive module of claim 9, wherein the housing defines a pump mount and wherein the pump inlet is formed in the pump mount.

11. The electric drive module of claim 4, wherein the external wall member defines first and second housing faces, wherein the sump outlet and the suction tube extend through the first housing face, and wherein the suction tube outlet extends through the second housing face.

12. The electric drive module of claim 11, wherein the first and second housing faces are perpendicular to one another.

13. The electric drive module of claim 4, wherein the filter-strainer outlet comprises a hollow tube that is received into the suction tube inlet and wherein a seal is disposed about the hollow tube and sealingly engages both the external wall member and the hollow tube.

14. The electric drive module of claim 4, wherein the suction tube has a suction tube outlet, wherein the electric drive module further comprises a lubricant pump having a pump inlet, and wherein the pump inlet is directly coupled to the suction tube outlet.

15. The electric drive module of claim 7, further comprising a lubricant pump and a lubricant conduit, the lubricant pump having a pump inlet, the lubricant conduit being coupled in fluid communication to a suction tube outlet of the suction tube and the pump inlet.

16. The electric drive module of claim 15, wherein the housing defines a pump mount and wherein the pump inlet is formed in the pump mount.

17. The electric drive module of claim 7, wherein the external wall member defines first and second housing faces, wherein the sump outlet and the suction tube extend through the first housing face, and wherein the suction tube outlet extends through the second housing face.

18. The electric drive module of claim 17, wherein the first and second housing faces are perpendicular to one another.

19. The electric drive module of claim 7, wherein the suction tube has a suction tube outlet, wherein the electric drive module further comprises a lubricant pump having a pump inlet, and wherein the pump inlet is directly coupled to the suction tube outlet.

* * * * *